No. 41,796. T. J. TOWNSEND. PATENTED MAR. 1, 1864.
LAMP CHIMNEY.

UNITED STATES PATENT OFFICE.

T. J. TOWNSEND, OF BALTIMORE, MARYLAND.

IMPROVEMENT IN LAMP-CHIMNEYS.

Specification forming part of Letters Patent No. 41,796, dated March 1, 1864.

*To all whom it may concern:*

Be it known that I, T. J. TOWNSEND, of Baltimore, in the county of Baltimore and State of Maryland, have invented a new and Improved Lamp-Chimney; and I do hereby declare that the following is a full, clear, and exact description of the same, reference being had to the accompanying drawings, making a part of this specification, in which—

Figure 1:
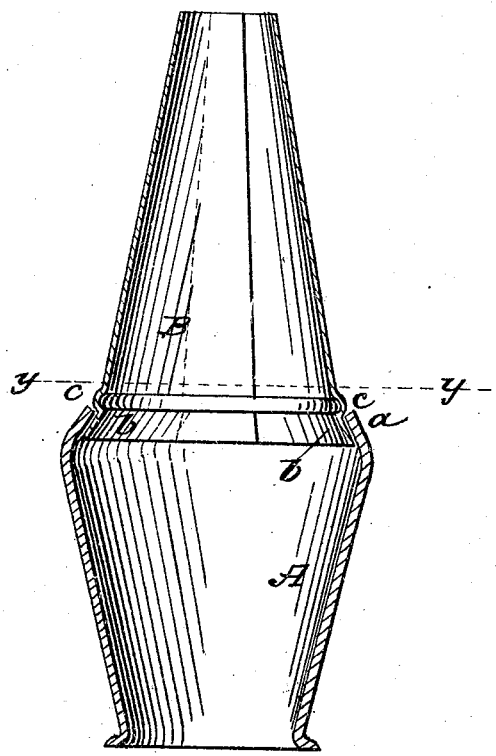
Figure 2:
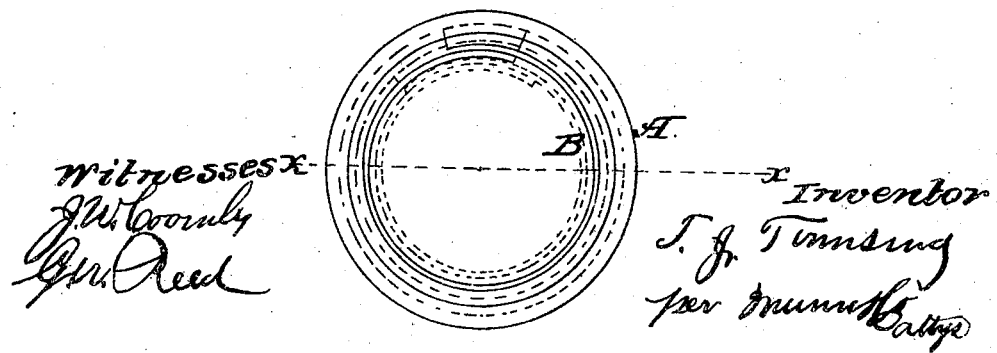

Figure 1 is a vertical central section of my invention, taken in the line $xx$, Fig. 2; Fig. 2, a horizontal section of the same, taken in the line $yy$, Fig. 1.

Similar letters of reference indicate corresponding parts in the two figures.

This invention relates to a new and useful improvement in that class of draft-chimneys for lamps which are provided with a metallic upper portion in order to prevent breakage—a contingency of very frequent occurrence in the use of the entire glass chimneys, in consequence of an unequal expansion of the same under the heat of the flame.

The invention consists in the means employed for attaching the upper metallic portion of the chimney to the lower glass portion, as hereinafter set forth, whereby the former may be very readily attached to and detached from the latter for cleansing purposes, and also for lighting the lamp.

To enable those skilled in the art to fully understand and construct my invention, I will proceed to describe it.

A represents the lower glass portion of the chimney, which may be of inverted conical or other proper form, the upper edge, $a$, being inclined inward, as shown clearly in Fig. 1.

B is the upper metallic portion, which is of conical form, and constructed of sheet metal, iron, brass, or other suitable metal. This metal part B is not soldered together at its edges, the latter being disconnected, so that they may overlap and admit of the part B having a certain degree of elasticity, so that it may be contracted in diameter under the pressure of the hand, and be allowed to expand when the pressure of the hand is removed. The lower end, $b$, of the part B is made of flaring form, corresponding to the inclination of the upper end, $a$, of the glass portion A; and B, just above or at the upper edge of the flaring part $b$, has a projection, $c$, swaged or otherwise made circumferentially around it, as shown clearly in Fig. 1.

From the above description it will be seen that by compressing the metal part B of the chimney the lower flaring end, $b$, may be inserted in the upper end of the glass portion A, and the elasticity of B will cause its flaring end $b$ to fit snugly against the inclined edge $a$ of the glass portion A, and prevent B being withdrawn from A, while the projection $c$ will prevent B being forced down into A, as will be fully understood by referring to Fig. 1; and it will further be seen that in order to detach B from A all that is required is simply to compress B so that its lower end, $b$, may be withdrawn from the upper end of A.

I do not confine myself to the precise arrangement or construction herein shown and described, for that may be modified in various ways and the same end attained.

Having thus described my invention, what I claim as new, and desire to secure by Letters Patent, is—

The employment or use, in a lamp-chimney, of a metal top, B, so constructed and arranged as to admit of expanding and contracting circumferentially for the purpose of being readily fitted to and detached from the glass portion A of the chimney, substantially as set forth.

T. J. TOWNSEND.

Witnesses:
   W. M. WATTS,
   A. J. BARRETT.